United States Patent [19]
Wojnowski

[11] Patent Number: 6,089,639
[45] Date of Patent: Jul. 18, 2000

[54] VEHICLE UTILITY BODY

[75] Inventor: Stanley J. Wojnowski, Mendon, Mass.

[73] Assignee: United Plastic Fabricating, Inc., North Andover, Mass.

[21] Appl. No.: 09/027,172

[22] Filed: Feb. 20, 1998

[51] Int. Cl.[7] .................................................. B60R 9/02
[52] U.S. Cl. ............................................................ 296/37.6
[58] Field of Search .................................... 296/37.6, 183

[56] References Cited

U.S. PATENT DOCUMENTS

| | | | |
|---|---|---|---|
| 3,022,105 | 2/1962 | Tjaarda | 296/28 |
| 3,068,038 | 12/1962 | Douglass, Jr. | 296/24.1 |
| 3,082,899 | 3/1963 | Squier et al. | 220/1.5 |
| 3,163,434 | 12/1964 | Krueger | 280/5 |
| 3,326,595 | 6/1967 | Ogilvie | 296/37.6 |
| 3,722,946 | 3/1973 | Cary | 296/23 |
| 4,126,349 | 11/1978 | Nelson et al. | 296/24 R |
| 5,098,765 | 3/1992 | Bien | 428/134 |
| 5,228,742 | 7/1993 | Johnson et al. | 296/191 |
| 5,421,645 | 6/1995 | Young | 312/108 |
| 5,511,848 | 4/1996 | Mobley | 296/183 |
| 5,590,925 | 1/1997 | Banks, Sr. | 296/24.1 |
| 5,615,922 | 4/1997 | Blanchard | 296/37.6 |
| 5,897,154 | 4/1999 | Albertini et al. | 296/37.6 |
| 5,979,973 | 11/1999 | Clare et al. | 296/189 |

Primary Examiner—D. Glenn Dayoan
Assistant Examiner—Paul Chenevert
Attorney, Agent, or Firm—Hamilton, Brook, Smith & Reynolds, PC

[57] ABSTRACT

A utility body for mounting to a frame of a vehicle includes a metallic support frame for securing to the vehicle frame. A metallic bed deck is mounted on the support frame. A first plastic side wall cabinet is mounted to the support frame on a first side of the bed deck. A second plastic side wall cabinet is mounted to the support frame on a second side of the bed deck. The first and second side wall cabinets each include a storage compartment. Each side wall cabinet has a front portion, a mid-portion and a rear portion. The front and rear portions of the side wall cabinets are slidably secured to the support frame, thereby allowing movement of the side wall cabinets relative to the support frame due to expansion and contraction of the plastic side wall cabinets.

19 Claims, 14 Drawing Sheets

VEHICLE UTILITY BODY

BACKGROUND OF THE INVENTION

Trucks used for construction or maintenance work (for example, carpentry, plumbing, electrical work, etc.) are commonly fitted with a truck utility body behind the cab instead of a standard pickup truck bed. Truck utility bodies typically have side walls with cabinets for storing tools and equipment. Such utility bodies are usually made of either steel or fiberglass. The problem with steel utility bodies is that they are subject to rusting, denting and corroding. In addition, steel utility bodies are heavy which reduces the gas milage of the truck and limits the pay load which can be carried. On the other hand, fiberglass utility bodies do not rust or corrode and are much lighter than steel utility bodies. However, fiberglass utility bodies are not as strong as steel utility bodies and are brittle making them subject to cracking and breaking.

SUMMARY OF THE INVENTION

The present invention provides a light weight vehicle utility body which is resistant to rusting, corroding, denting, cracking and breaking. The present invention utility body mounts to a frame of a vehicle and includes a metallic support frame for securing to the vehicle frame. A metallic bed deck is mounted on the support frame. A first plastic side wall cabinet is mounted to the support frame on a first side of the bed deck. A second plastic side wall cabinet is mounted to the support frame on a second side of the bed deck. The first and second side wall cabinets each include a storage compartment. Each side wall cabinet has a front portion, a mid-portion and a rear portion. The front and rear portions of the side wall cabinets are slidably secured to the support frame, thereby allowing movement of the side wall cabinets relative to the support frame due to expansion and contraction of the plastic side wall cabinets.

In preferred embodiments, the support frame includes a generally planar frame portion on which the bed deck is mounted and outrigger members located below said planar frame portion for supporting bottom surfaces of the side wall cabinets. The outrigger members allow the side wall cabinets to extend below the bed deck.

The side wall cabinets are preferably formed from thick high impact strength polypropylene panels which are welded together. The mid-portions of the side wall cabinets are firmly secured to the bed deck while the front and rear portions of the side wall cabinets are slidably secured to the bed deck, thereby allowing movement of the side wall cabinets relative to the bed deck due to expansion and contraction of the side wall cabinets. Typically, the side wall cabinets are slidably secured to the frame and bed deck with the use of slotted holes in the frame and side wall cabinets. Front and rear plates secure respective front and rear portions of the side wall cabinets together. The front and rear plates are moveable relative to the support frame and bed deck to allow for expansion and contraction of the side wall cabinets. Each side wall cabinet has a hollow plastic door for providing access to a storage compartment. The door has a side edge with a vent opening therethrough for venting the door. A drip edge extends along an interior edge of the door for channeling water. The door is secured to a hinge extending perpendicularly from the utility body. The hinge provides a door stop for the door.

Each side wall cabinet has a vent including an exterior opening connected to an interior opening by a vent passageway. The exterior and interior openings are offset from each other with the exterior opening being positioned above the interior opening. The vent passageway includes a first wall opposite to the exterior opening and a second wall opposite to the interior opening. The vent further includes a drain extending downwardly from the vent passageway for draining water from the vent passageway. Preferably, the exterior opening is covered by downwardly directed louvres and the interior opening is covered by upwardly directed louvres. The vents of the side wall cabinets allow the side wall cabinets to exchange air with the exterior for maintaining a constant temperature while at the same time preventing water from entering.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
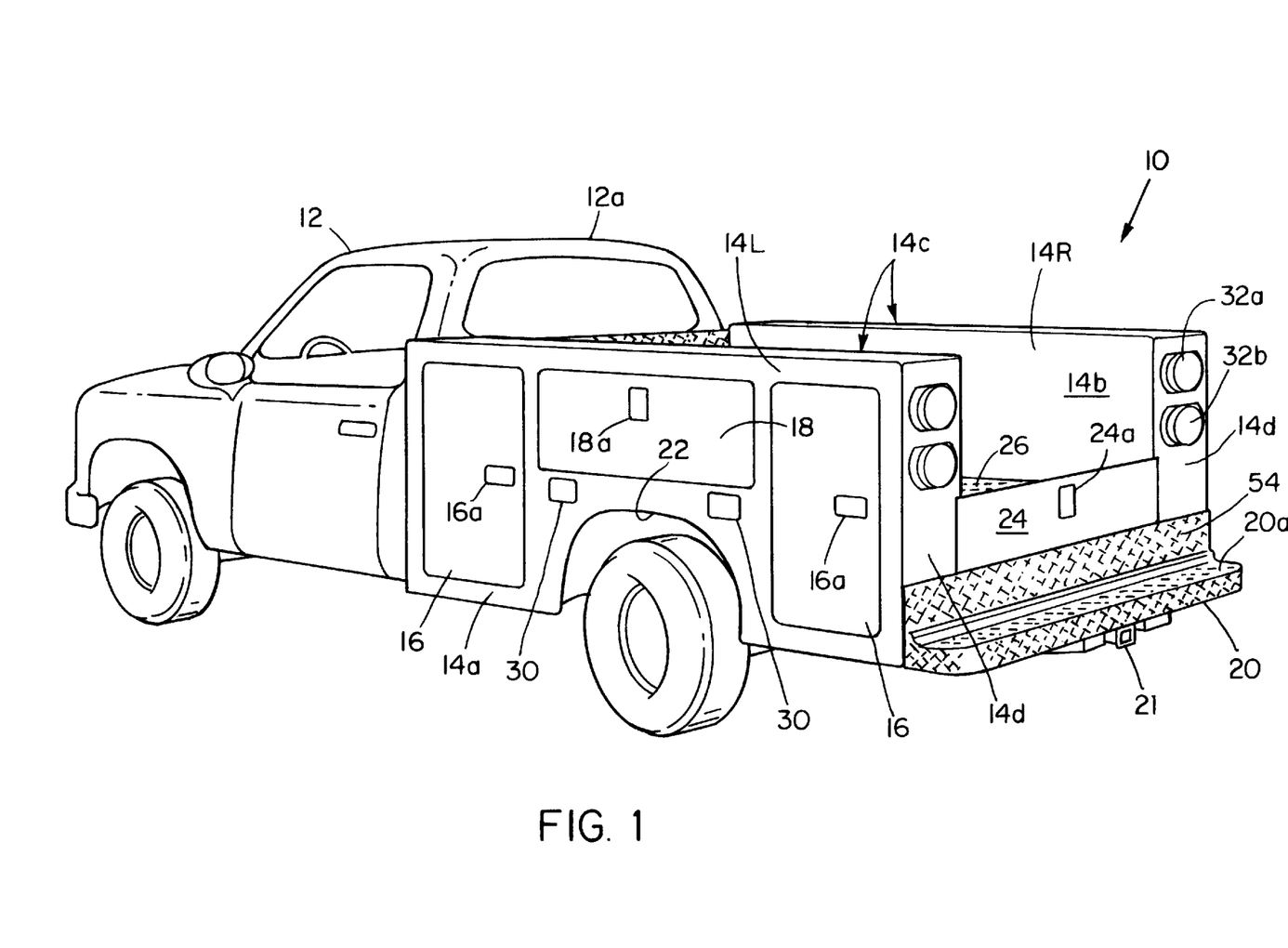
FIG. 1 is a perspective view of the present invention vehicle utility body mounted on a truck behind the cab.
Figure 2:
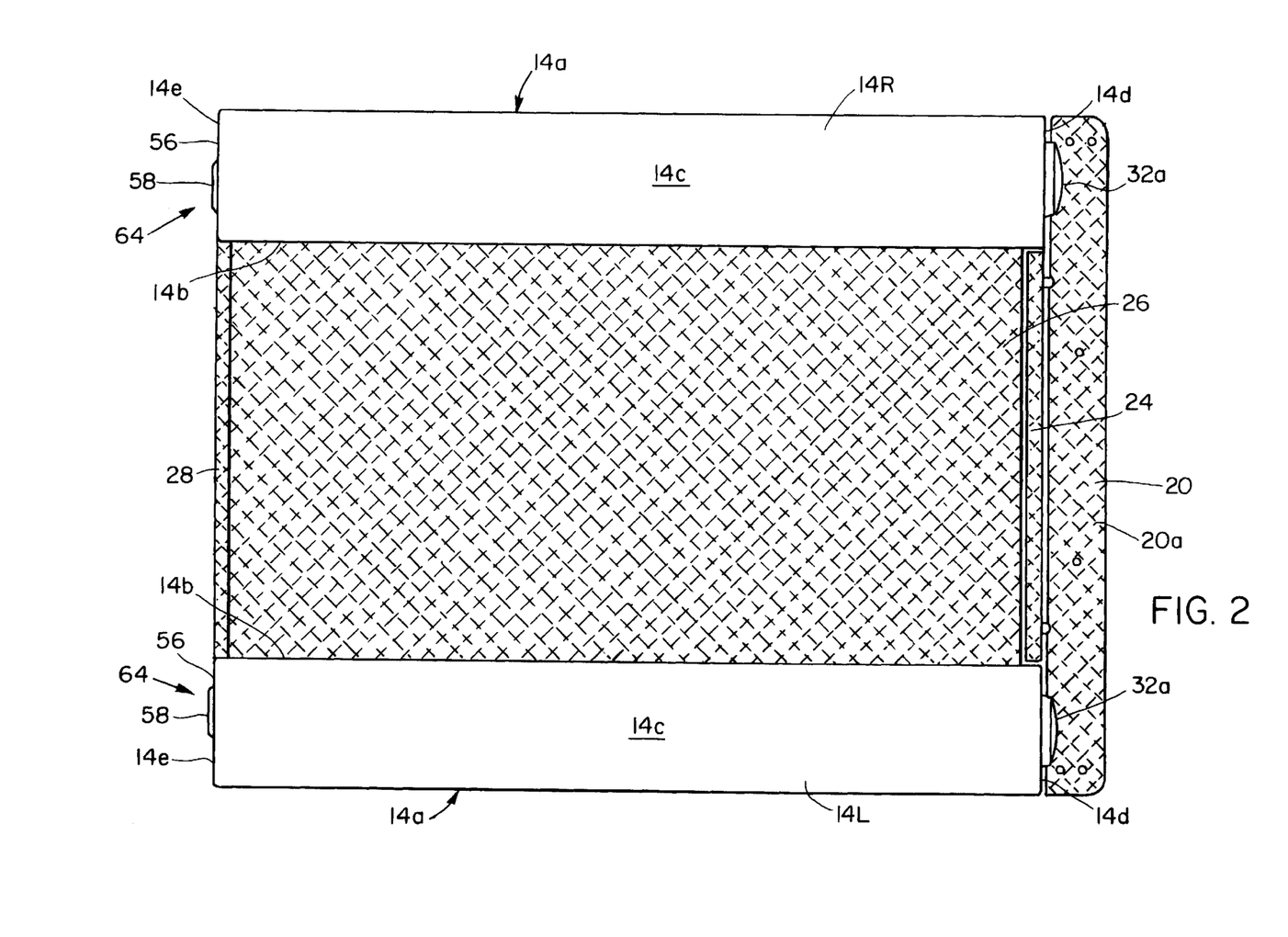
FIG. 2 is a top view of the present invention vehicle utility body.
Figure 3:
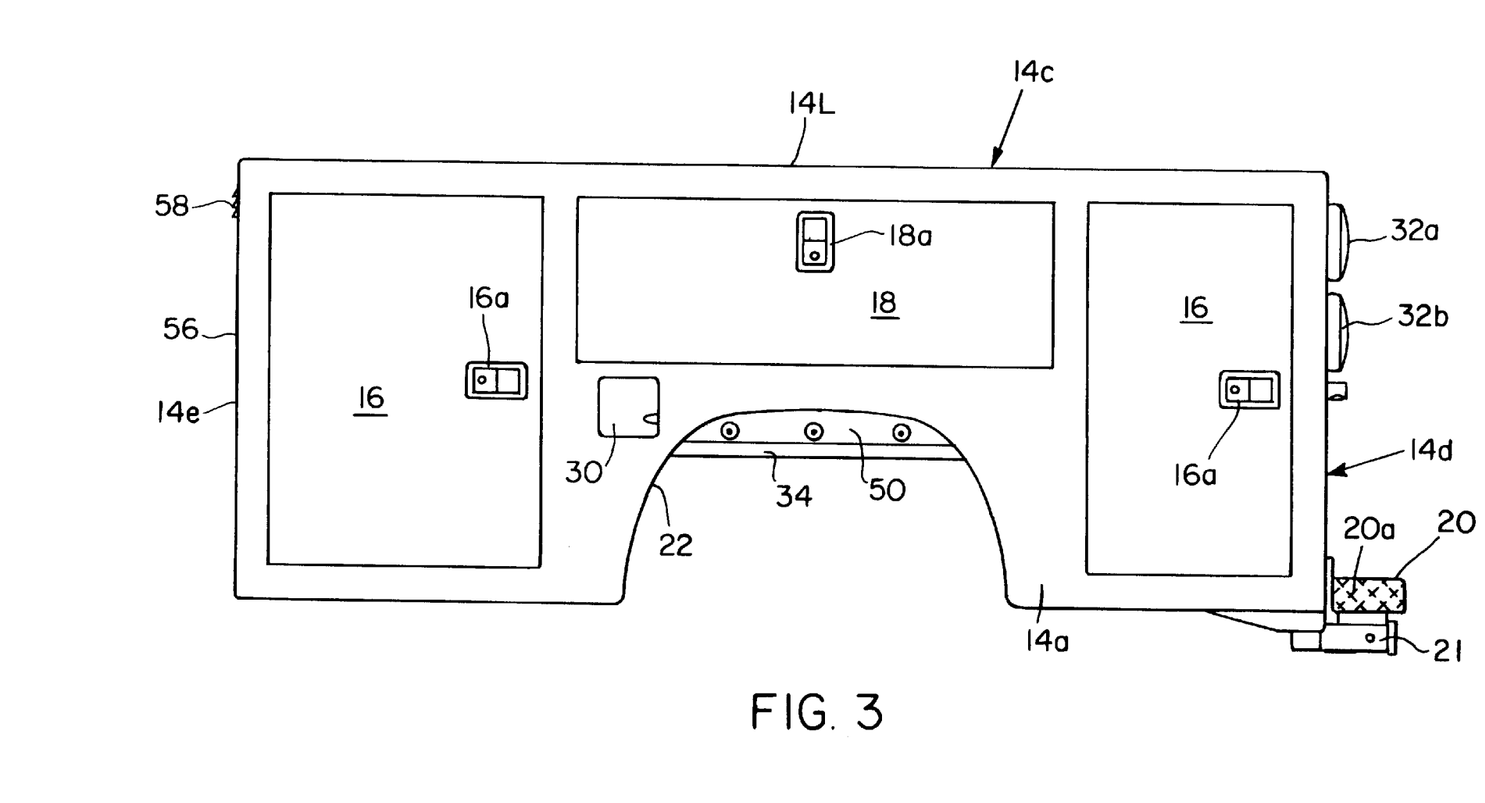
FIG. 3 is a side view of the vehicle utility body.
Figure 4:
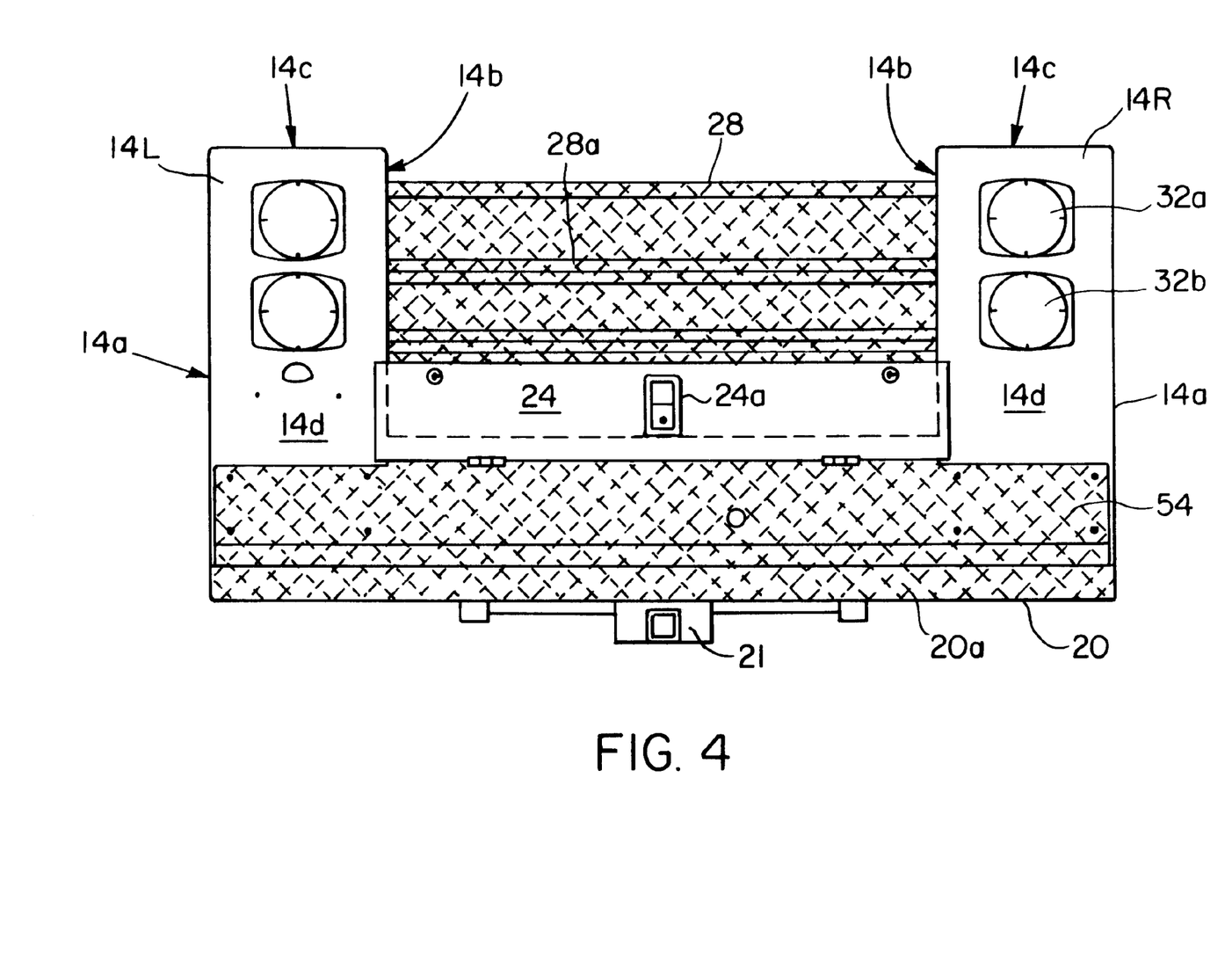
FIG. 4 is a rear view of the vehicle utility body.
Figure 5:
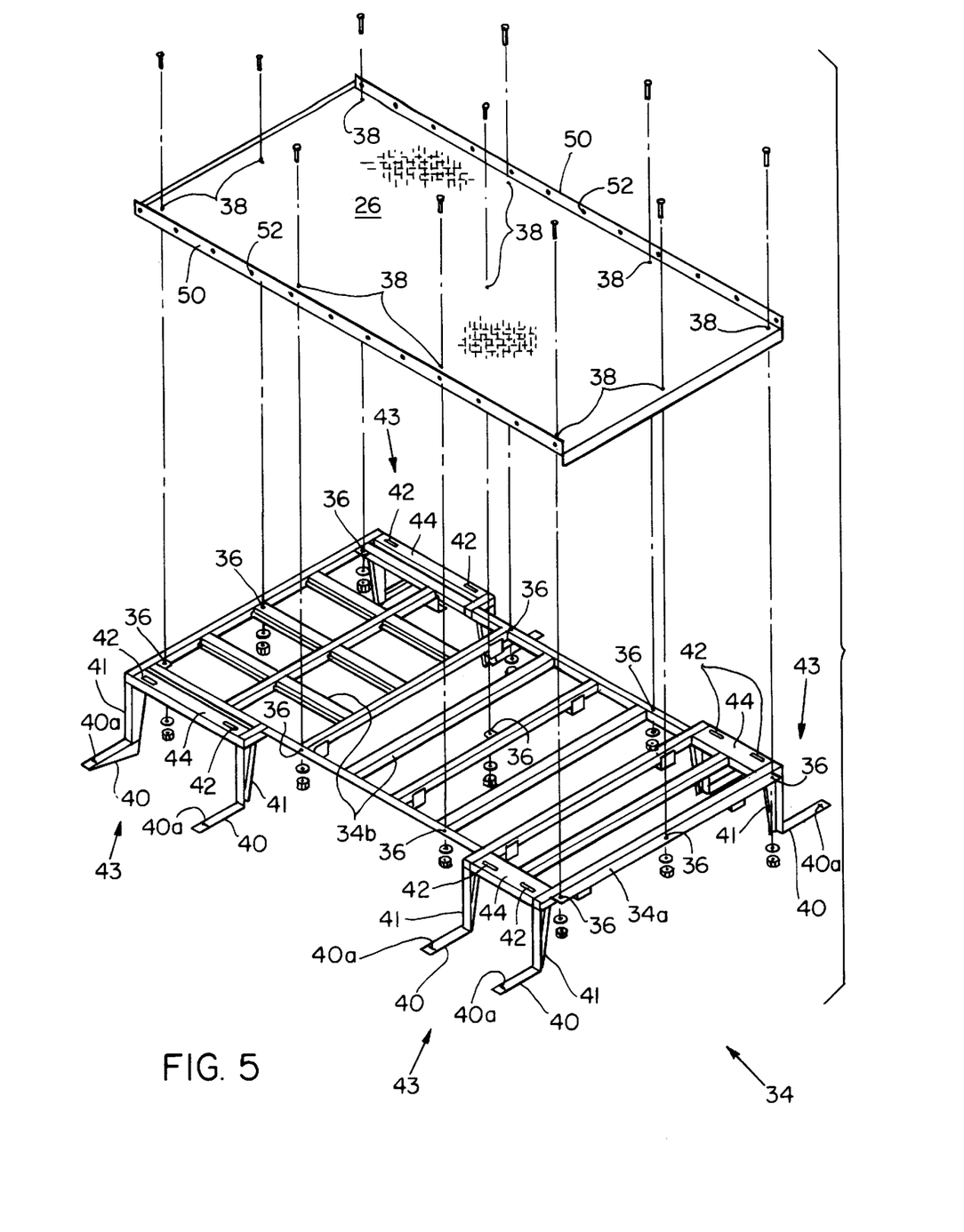
FIG. 5 is a perspective view of the bed and frame of the vehicle utility body positioned for assembly.
Figure 6:
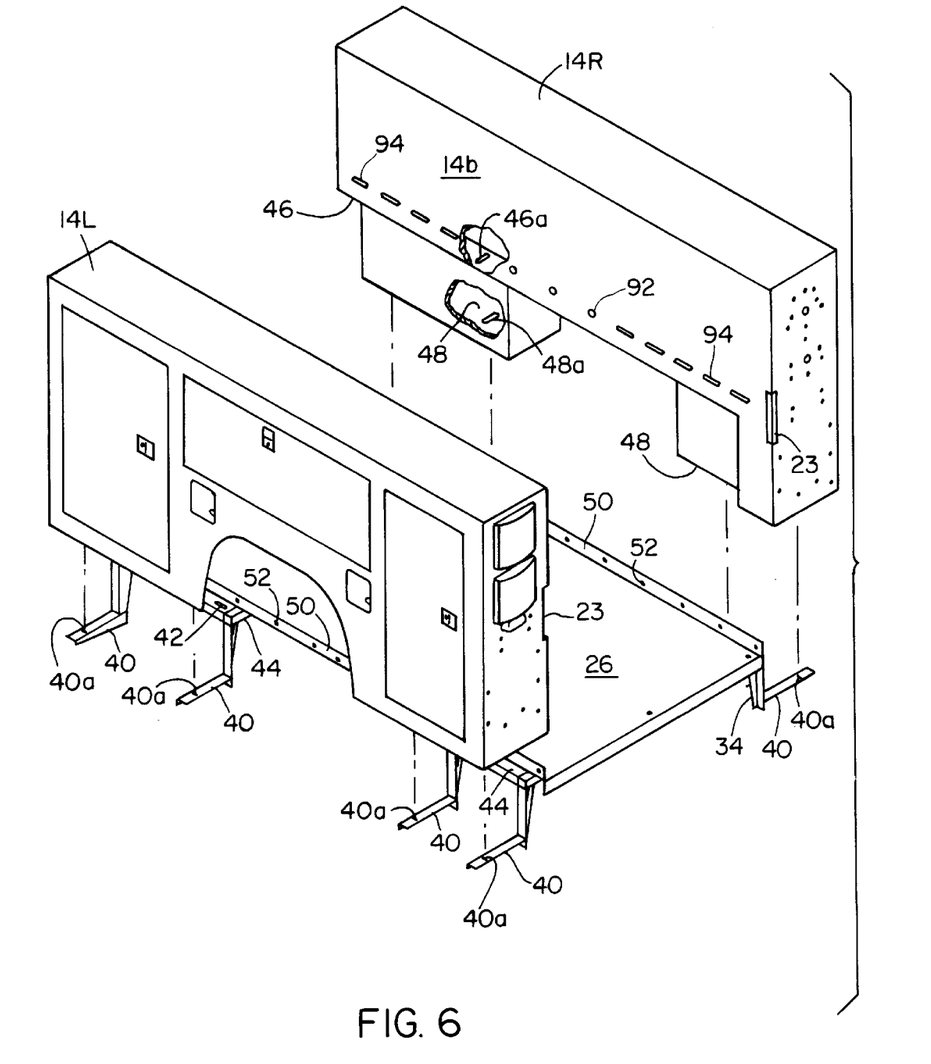
FIG. 6 is a perspective view of the side wall cabinets of the vehicle utility body positioned for assembly to the frame and bed with wall portions broken away to depict slotted mounting holes.
Figure 10:
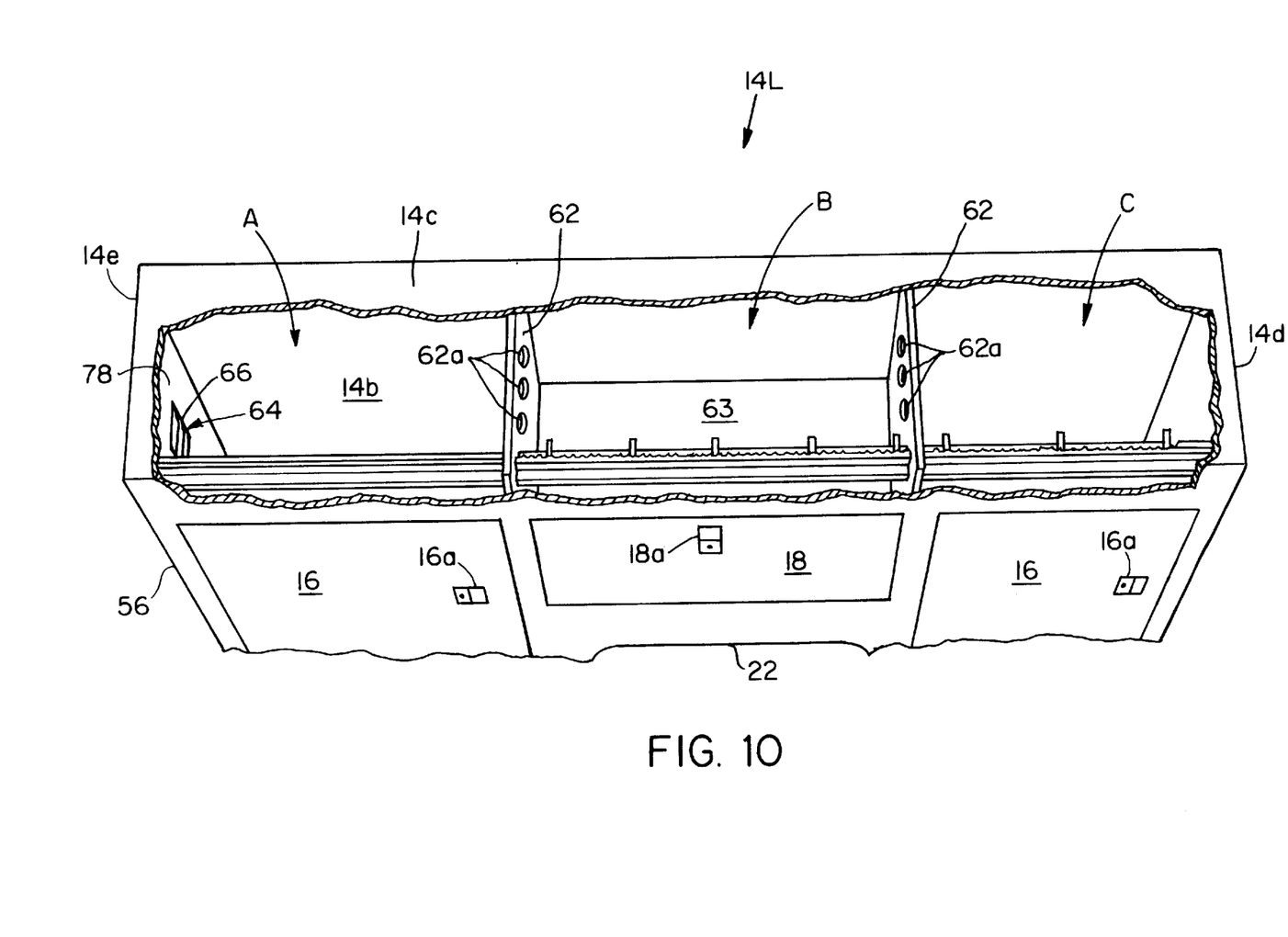
FIG. 10 is a top perspective view of a side wall cabinet with the top wall broken away to show the side wall cabinet compartments.

Referring to FIGS. 1–4, vehicle utility body 10 is a composite steel, aluminum and plastic utility body for mounting to a vehicle such as a truck 12 behind the cab 12a in place of a standard truck bed. Utility body 10 includes a generally rectangular steel frame 34 onto which a rectangular aluminum diamond plate bed 26 is mounted (FIGS. 5 and 6). Plastic left 14L and right 14R side wall cabinets are mounted to opposite sides of frame 34 and bed 26. Side wall cabinets 14L/14R are generally rectangular in shape and each have an outer side wall 14a, an inner side wall 14b, a top wall 14c, a rear end 14d and a front end 14e. Side wall cabinets 14L/14R are preferably fabricated from thick high impact strength plastic panels which are welded together but, alternatively, can be molded. Each side wall cabinet 14L/14R is preferably partitioned into multiple compartments A, B and C (FIG. 10). Two plastic end compartment doors 16 are positioned on opposite sides of the wheel well 22 of each side wall cabinet 14L/14R and a plastic center compartment door 18 is positioned above the wheel well 22 for providing access to the compartments therein. Doors 16 and 18 each include lockable latches 16a and 18a, respectively, for security purposes. Doors 16 swing open to the side and doors 18 swing open downwardly. Two small plastic fuel doors 30 with removable pockets are positioned front and rear of the wheel well 22 of side wall cabinet 14L for providing access to the fuel fills of the truck 12. Alternatively, only one fuel door 30 may be employed. Tail lights 32a and 32b are positioned on the rear ends 14d of side wall cabinets 14L/14R. Side wall cabinets 14L/14R are secured together at the front ends 14e by a reinforced aluminum diamond plate front end plate 57 and at the rear ends 14d by an aluminum diamond plate rear end plate 54. A Metallic tail gate 24 having a diamond plate inner surface is flush mounted between the rear ends 14d of side wall cabinets 14L/14R. A latch mechanism 24a allows tail gate 24 to open and close. A steel step bumper 20 with a diamond plate overlay 20a is mounted to the frame 60 (FIG. 9) of the truck 12 and extends behind rear end plate 54. Step bumper 20 includes an integral trailer hitch 21 located underneath step bumper 20.

The use of a steel frame 34 provides utility body 10 with strength while the use of plastic material for the side wall cabinets 14L/14R and aluminum for the bed 26 and end plates 57/54 keeps utility body 10 light in weight. The light weight of utility body 10 allows a bigger payload to be carried and better gas mileage than with steel utility bodies. The plastic material employed for the side wall cabinets 14L/14R is resistant to rusting, corroding, denting, cracking and breaking. In addition, the aluminum portions of utility body 10 also do not rust.

The side wall cabinets 14L/14R are preferably fabricated from ½ inch panels of ultra high impact copolymer polypropylene made from Amoco's ACCTUF™ resin which is a U.V. stabilized, non corrosive and stress relieved thermoplastic. This provides side wall cabinets 14L/14R with ultra high impact strength and stiffness which does not dent, ding, rust or corrode. The ultra high impact polypropylene plastic employed is about 20% more impact resistant than conventional polypropylene at room temperature and 90% more impact resistant at 0° F. Alternatively, other suitable high impact plastics can be employed, for example, polyethylene.

Referring to FIG. 5, steel frame 34 has a planer rectangular frame portion 34a with a series of cross members 34b. The steel members forming frame portion 34a are preferably square or rectangular tubing and formed sheet stock. Frame 34 is preferably steel for strength purposes but, alternatively, can be aluminum or stainless steel. Frame 34 has four outrigger structures 43 positioned at each corner of frame 34. The outrigger structures 43 are positioned on opposing sides of frame 34 along the longer sides of frame 34. Each outrigger structure 43 includes a horizontal mounting member 44 extending along the edge of frame portion 34a. Two vertical members 41 extend downwardly from the ends of each horizontal member 44. A horizontal outrigger member 40 extends outwardly from the bottom of each vertical member 41 below frame portion 34a.

Bed 26 is secured to frame portion 34a with screws through holes 38 in bed 26 and holes 36 in frame portion 34a. Bed 26 has two opposing flanges 50 extending upwardly at right angles from bed 26 along the longer sides of bed 26. Each flange 50 has a series of holes 52 extending therethrough for securing to side wall cabinets 14L/14R. Bed 26 is preferably made of aluminum for weight reduction but, alternatively, can be plastic, steel or stainless steel.

Figure 7:
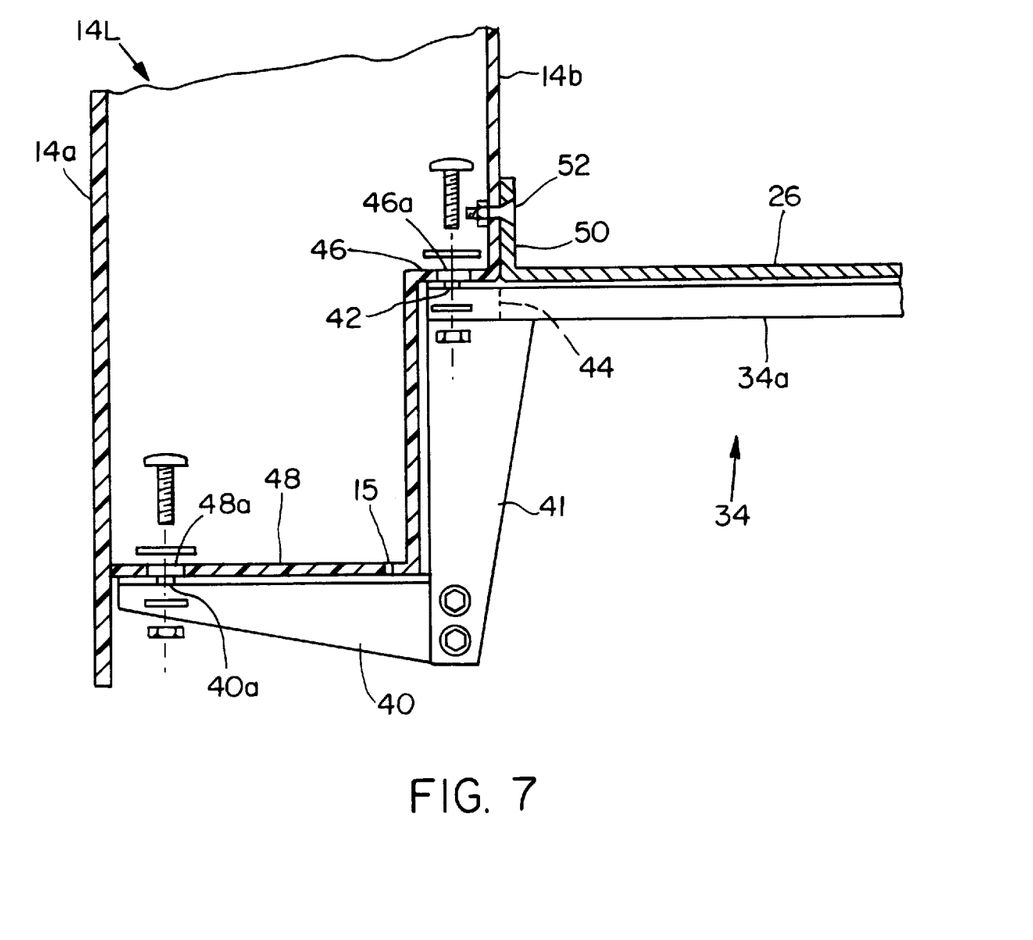
FIG. 7 is an end view of a portion of a side wall cabinet in section being mounted to the frame and bed.

Referring to FIGS. 6 and 7, the side wall cabinets 14L/14R each have a ledge 46 which is bolted to mounting members 44 through slotted holes 46a in ledge 46 and slotted holes 42 in mounting members 44. The bottom walls 48 of side wall cabinets 14L/14R are bolted to outrigger members 40 via slotted holes 48a in bottom walls 48 and slotted holes 40a in outrigger members 40. By being below frame portion 34a, outrigger members 40 allow portions of side wall cabinets 14L/14R to extend below bed 26, thereby, maintaining a low center of gravity. Slotted holes 42 and 40a are elongated in the longitudinal direction of side cabinets 14L/14R and frame 34 to allow movement of side wall cabinets 14L/14R relative to frame 34 in the longitudinal direction due to expansion and contraction of the plastic side wall cabinets to prevent buckling of the side wall cabinets. Slotted holes 46a and 48a are elongated in the transverse direction of side cabinets 14L/14R for increasing the mounting tolerance. The inner side walls 14b of side wall cabinets 14L/14R have a series of middle holes 92 and outer slots 94 positioned above ledge 46. Side wall cabinets 14L/14R are secured to bed 26 with bolts through holes 92 and slots 94 in cabinets 14L/14R and holes 52 on flanges 50 of bed 26. The middle holes 92 are circular and are firmly bolted to flanges 50 of bed 26. The outer slots 94 are elongated in the longitudinal direction of side cabinets 14L/14R and bed 26 and are bolted less tightly to flanges 50. The outer slots 94 allow the ends of side wall cabinets 14L/14R to slide relative to bed 26 in the longitudinal direction due to expansion and contraction of side wall cabinets 14L/14R. Temperature changes can cause side wall cabinets 14L/14R to expand and contract about 1% of the total length of the side wall cabinets in the longitudinal direction. This can result in expansion and contraction of about one inch over the length of side wall cabinets 14L/14R. Frame 34 and bed 26 expand and contract much less than side wall cabinets 14L/14R. As a result, slots 40a, 42 and 94 prevent side wall cabinets 14L/14R from buckling due to expansion and contraction by allowing movement of the side wall cabinets relative to both frame 34 and bed 26 in the longitudinal direction.

Figure 8:
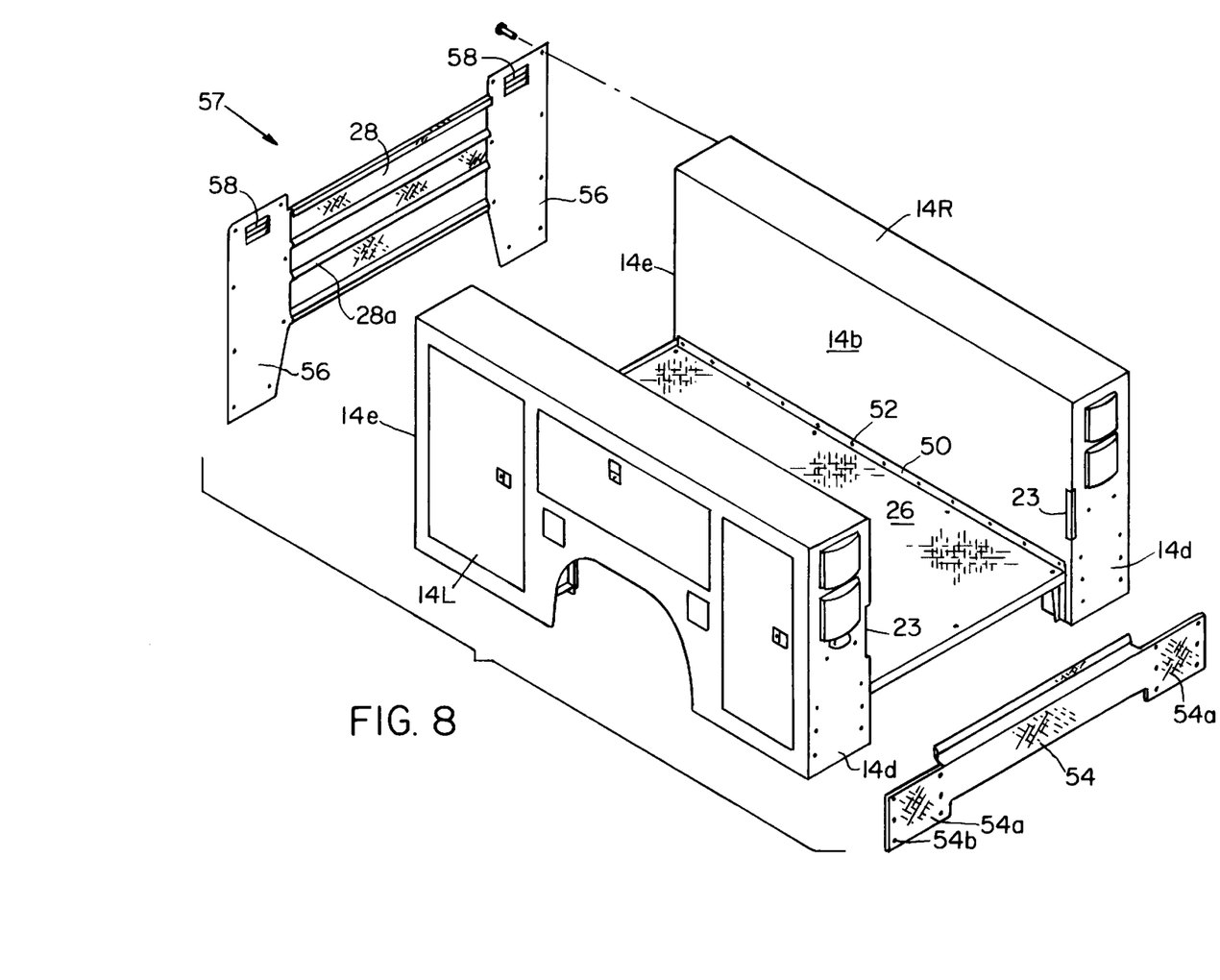
FIG. 8 is a perspective view of the front end plate and rear end plate positioned for mounting to the side wall cabinets.

Referring to FIG. 8, front end plate 57 has a front bed wall 28 and two front cabinet covers 56 on opposite sides of front bed wall 28. Front cabinet covers 56 are preferably one piece and mounted to the front ends 14e of cabinets 14L/14R. Front panel 57 is not secured to frame 34 or bed 26 so as not to restrict the movement of side wall cabinets 14L/14R relative to the front of frame 34 and bed 26 when expanding or contracting. Securing front panel 57 to frame 34 or bed 26 would cause side wall cabinets 14L/14R to buckle. Front bed wall 28 extends almost the full height of side wall cabinets 14L/14R for protecting front of the side wall cabinets 14L/14R. A series of ribs 28a stiffen and strengthen front bed wall 28. End portions 54a of rear end plate 54 are mounted to the rear ends 14d of side wall cabinets 14L/14R. Rear end plate 54 is also not mounted to frame 34 or bed 26 which allows side wall cabinets 14L/14R to move relative to the rear of frame 34 and bed 26 when expanding or contracting in order to prevent buckling. Front end plate 57 and rear end plate 54 provide lateral strength and rigidity to side wall cabinets 14L/14R by securing the side wall cabinets together. This prevents side wall cabinets 14L/14R from bowing inwardly or outwardly.

Figure 9:
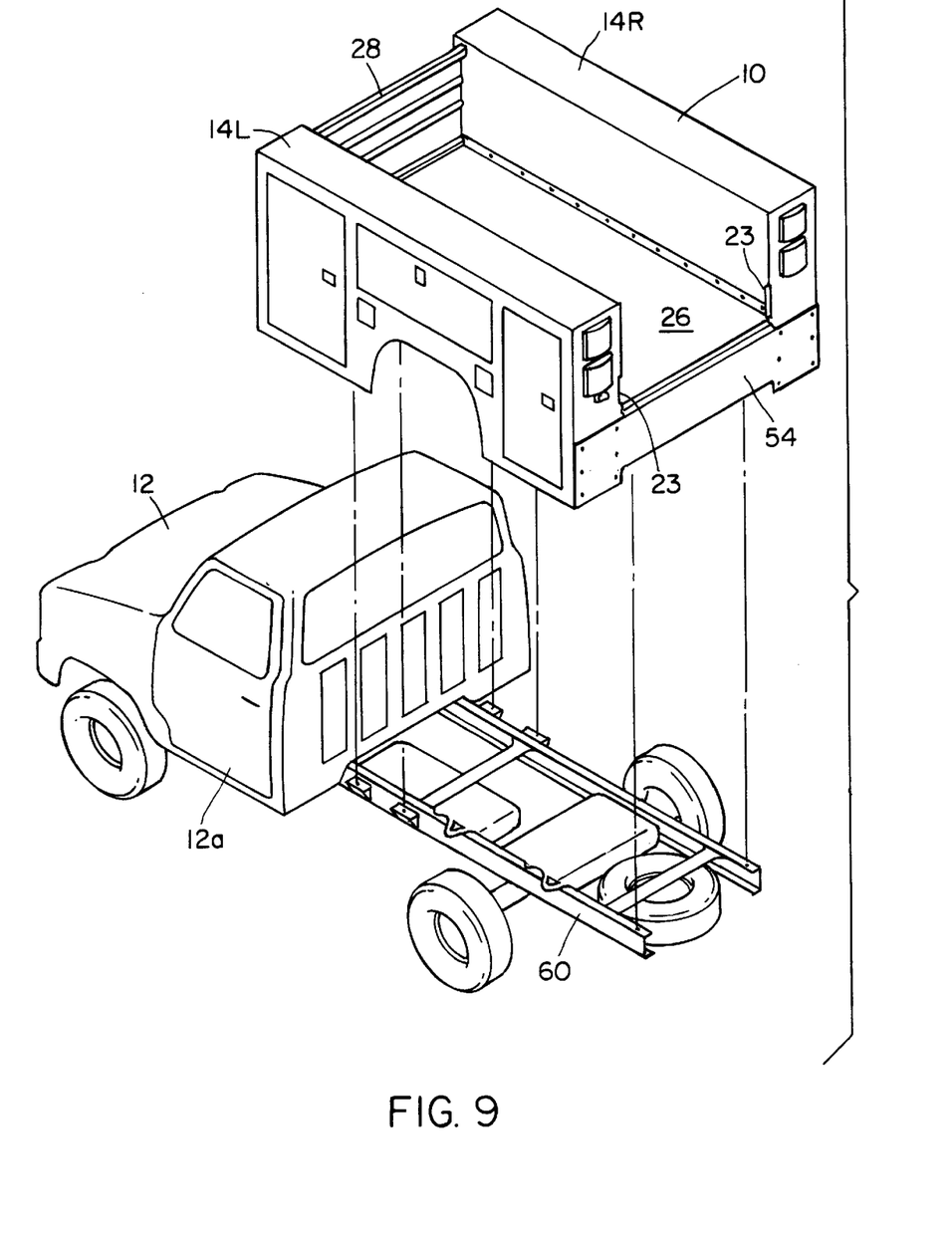
FIG. 9 is a perspective view of the vehicle utility body being installed on the frame of the truck.

Referring to FIG. 9, utility body 10 is mounted to truck 12 by securing the frame 34 of utility body 10 to the frame 60 of truck 12. Tail gate 24 is preferably installed prior to mounting utility body 10 to frame 60. Tail gate 24 is secured to rear end plate 54 by hinges and interfaces with latch plates 23 on side wall cabinets 14L/14R. After utility body 10 is mounted, the step bumper 20 is installed to the frame 60.

Referring to FIG. 10, the top wall 14c of side wall cabinet 14L is broken away to show the interior therein. The interior of side wall cabinet 14R is a mirror image thereof. Side wall cabinet 14L includes three interior compartments A, B and C separated from each other by partitions 62 and accessed through doors 16 and 18. Compartments A and C are located on opposite sides of wheel well 22 and compartment B which has a bottom wall 63 is located between compartments A and C above wheel well 22. Electrical interior lighting is included within compartments A, B and C for visibility in dark conditions. Any moisture which collects within side wall cabinet 14L due to condensation or sweating can escape through drain holes 15 (FIG. 7). A series of holes 62a extend through the upper ends of partitions 62 for cross ventilation between compartments A, B and C. Front end wall 78 of side wall cabinet 14L includes a vent 64 for venting cabinet 14L. Venting of side wall cabinet 14L allows air movement to maintain the interior temperature at about the outside ambient temperature. For example, on hot days, venting helps keep cabinet 14L cool so that the cabinet will not overheat. Overheating can cause over-expansion and buckling of side wall cabinet 14L as well as damage to the contents therein. In addition, over-expansion of side wall cabinet 14L can cause doors 16 and 18 to jam in their respective door frames.

Figure 11:
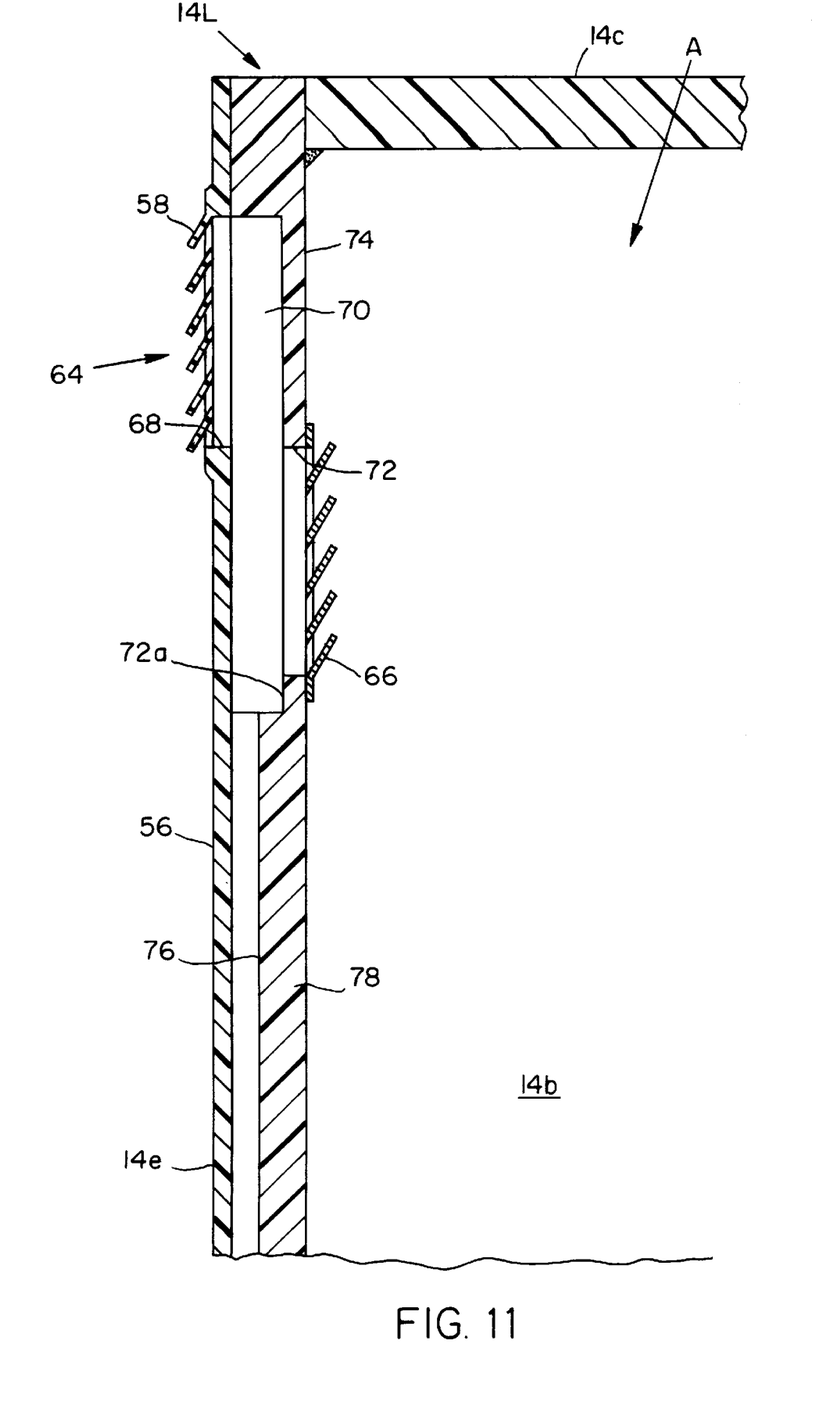
FIG. 11 is a sectional view of a portion of a side wall cabinet showing the venting arrangement.
Figure 12:
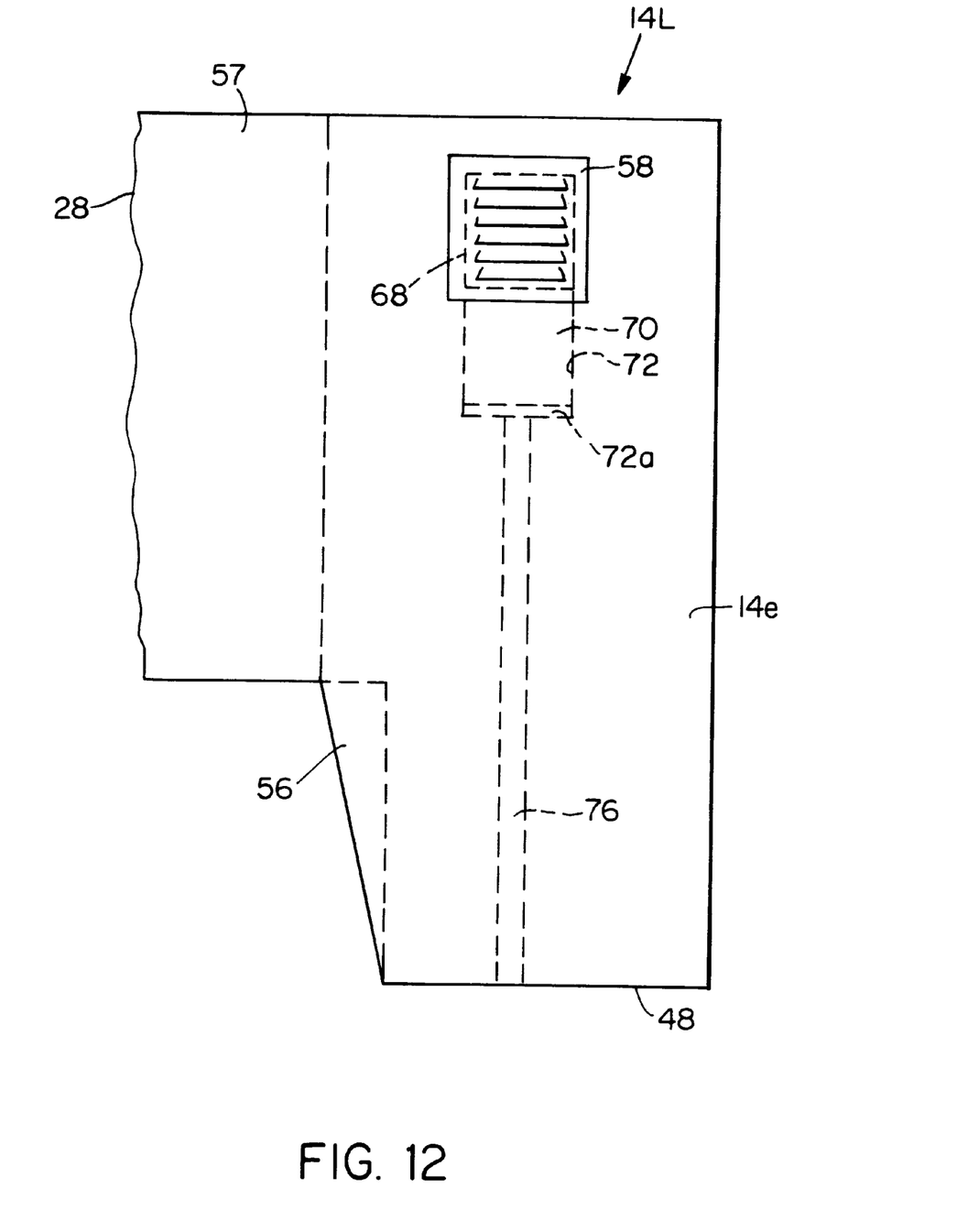
FIG. 12 is a front end view of a side wall cabinet showing the venting and drainage arrangements.

Referring to FIGS. 11 and 12, vent 64 includes an opening 68 through front cabinet cover 56 which is covered by a louvre plate 58 with downwardly facing louvres. Louvre plate 58 is preferably integrally formed within front cabinet cover 56 but alternatively, can be a separate component mounted to the surface of front cabinet cover 56. Opening 68 extends into a recessed area 70 formed in the outer surface of front end wall 78. The upper portion of recess 70 has a thin wall portion 74 opposite to opening 68. The recessed area 70 extends downwardly within front end wall 78 below opening 68. An opening 72 extends from recessed area 70 through front end wall 78 into compartment A. Opening 72 is positioned opposite to the closed portion of front cabinet cover 56 below wall portion 74 and opening 68. A louvre plate 66 having upwardly facing louvres covers opening 72 on the interior surface of front end wall 78. Louvre plate 66 is preferably formed from plastic and is sealed to the inner surface of front end wall 78 to prevent leakage there between. Opening 68, opening 72 and recessed area 70 are preferably rectangular in shape, but, alternatively, can have other suitable shapes such as circular, oval etc. A drainage slot 76 is formed in the outer surface of front end wall 78 and extends downwardly from recess 70 to the bottom wall 48 of side wall cabinet 14L. Front cabinet cover 56 encloses drainage slot 76. Recess 70 is essentially an enclosed passageway in communication with a drainage slot 76, an opening 68 and an opening 72.

Vent 64 allows air within side wall cabinet 14L to vent to the exterior while preventing water from entering into compartment A. Louvre plate 58 makes it difficult for water to enter recess 70. Any water entering louvre plate 58 is deflected downwardly by wall portion 74. This water is allowed to drain downwardly from side wall cabinet 14L through channel 76. The upwardly facing louvres of louvre plate 66 on the interior surface of wall 78 prevents the water deflected by wall portion 74 from entering compartment A. Lip 72a at the bottom of opening 72 is high enough to prevent water at the bottom of recess 70 from entering the bottom of opening 72. Although vent 64 and drain 76 are preferably formed into the front end 14e of cabinet 14L, alternatively, vent 64 and drain 76 can be a separate unit which is mounted to front end 14e. In addition, drain 76 does not need to extend all the way to bottom wall 48 but can exit front end 14e just below vent 64.

Figure 13:
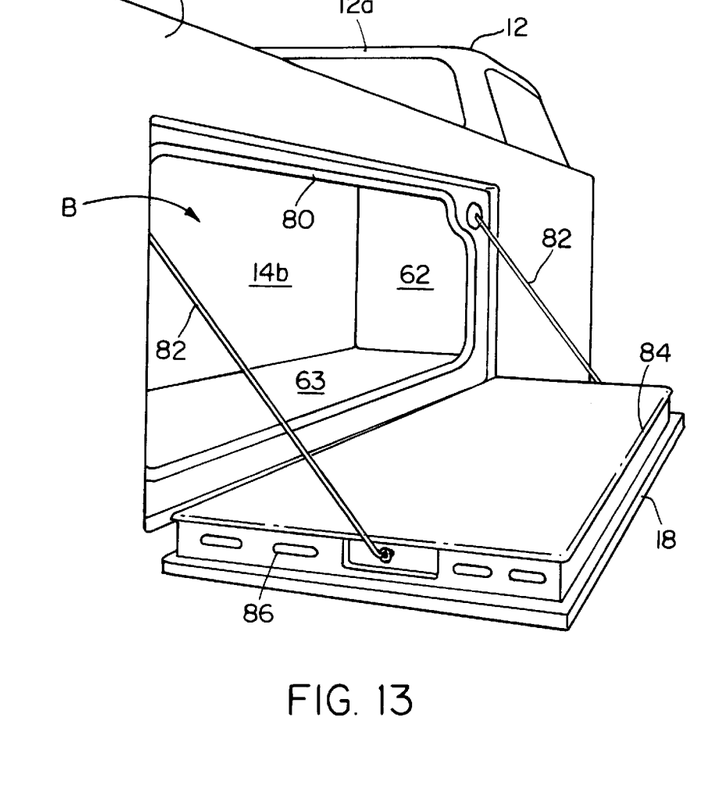
FIG. 13 is a perspective view of the center compartment door swung into an open position showing vent openings on the sides for venting the door.

FIG. 13 depicts the center compartment door 18 of side wall cabinet 14R in the open position. The arrangement for side wall cabinet 14L is similar. Door 18 includes support wires 82 which allow door 18 to be held open in a horizontal position for use as a workbench. A gasket 80 surrounding the opening of compartment B makes a water tight seal with door 18 when door 18 is closed. A drip edge 84 extends along the interior edge of door 18 to prevent water from collecting near gasket 80. Door 18 is hollow in construction and includes vent openings 86 on the side edges for venting the interior of door 18 to the exterior. Allowing the exchange of air keeps the door 18 at about the same temperature as outer side wall 14a of cabinet 14R and the outside ambient temperature. This prevents door 18 from overexpanding or overcontracting relative to outer side wall 14a which can cause door 18 to jam within the door frame of compartment B. In other words, since both door 18 and side wall cabinet 14R are vented to the exterior, their respective temperatures are about the same so that door 18 and side wall cabinet 14R expand and contract about the same amount. Side compartment doors 16 are vented with openings 86 in similar fashion to door 18 so that doors 16 will expand and contract the same amount as side wall cabinet 14R. Doors 16 also have gaskets 80 surrounding the openings to compartments A and C as well as drip edges 84.

Figure 14:
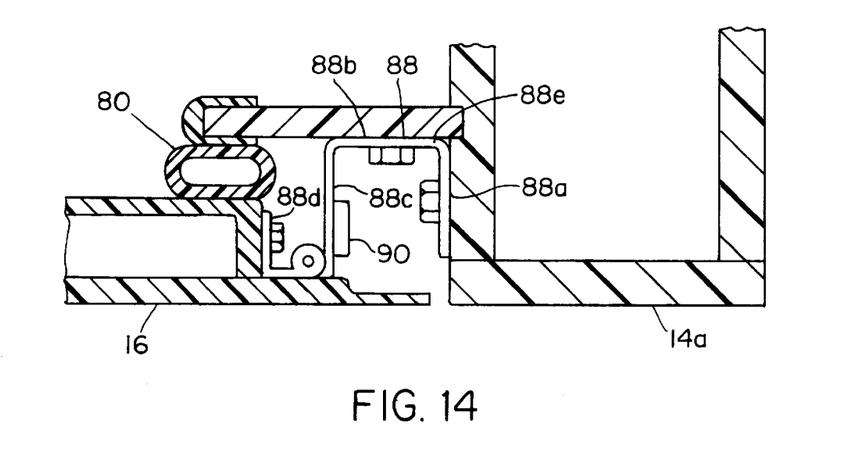
FIG. 14 is a top sectional view of the hinge and sealing arrangement for an end compartment door.

Referring to FIG. 14, side compartment doors 16 each have hinges 88 with a U-shaped mounting plate 88e. Hinge portion 88d is mounted to the edge of door 16 while the faces 88a and 88b of U-shaped mounting plate 88e are mounted to right angle surfaces of the door frame. Face 88c is parallel to face 88a and serves as a door stop for door 16. Door 16 includes a rubber bumper 90 for cushioning purposes.

Figure 15:
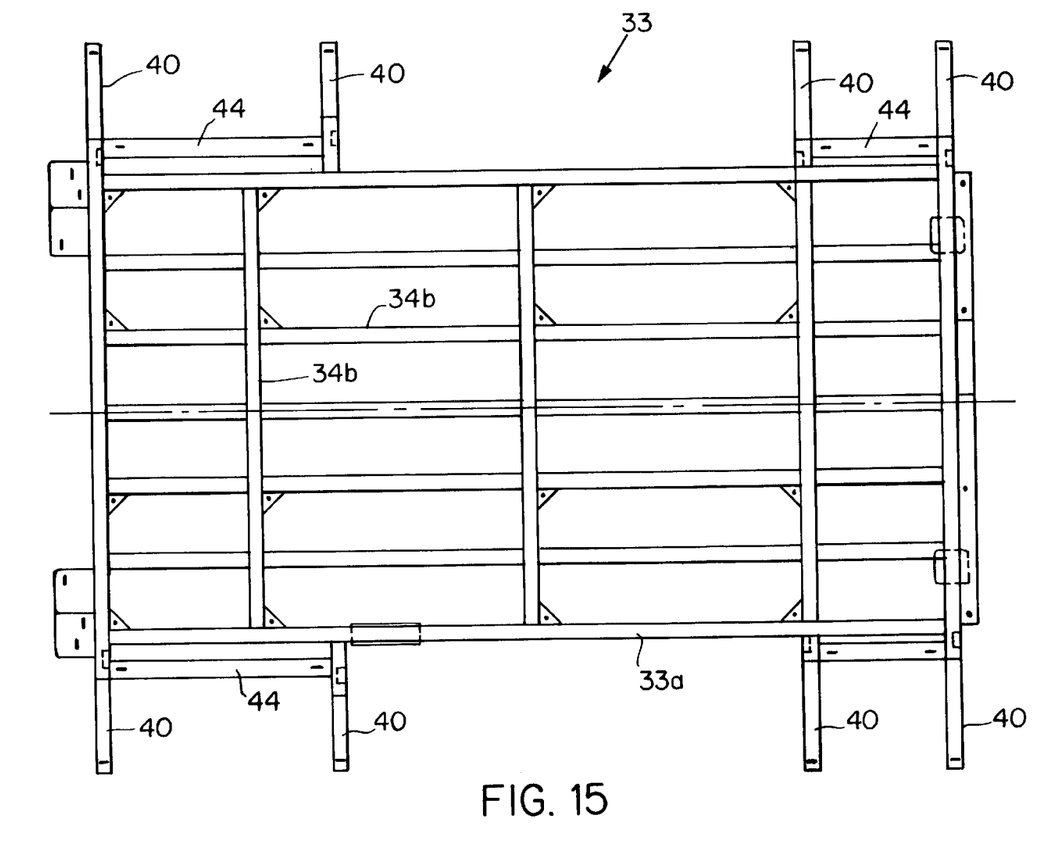
FIG. 15 is a plan view of another preferred frame.

FIG. 15 depicts another preferred frame 33 for utility body 10. Frame 33 differs from frame 34 in that frame 33 has a planar rectangular frame portion 33a with a more uniform arrangement of cross members 34b.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, although the walls and doors of the sidewall cabinets have been described to be plastic, alternatively, the side wall cabinets can be a composite of plastic and metal (such as aluminum). In addition, although side wall cabinets 14L/14R are shown to have three compartments, the number of compartments can be more or less than three depending upon the length of the side wall cabinets.

What is claimed is:

1. A utility body for mounting to a frame of a vehicle comprising:

a metallic support frame for securing to the vehicle frame;

a metallic bed deck mounted on the support frame;

a first plastic side wall cabinet mounted to the support frame on a first side of the bed deck;

a second plastic side wall cabinet mounted to the support frame on a second side of the bed deck, the first and second side wall cabinets each include a storage compartment, each side wall cabinet having a front portion, a mid-portion and a rear portion extending along a longitudinal direction, the front and the rear portions of the side wall cabinets being slidably secured in the longitudinal direction to the support frame, thereby allowing movement of the side wall cabinets in the longitudinal direction relative to the support frame due to expansion and contraction of the plastic side wall cabinets; and front and rear plates securing respective front and rear portions of the first and second side wall cabinets together without being secured to the support frame and the bed deck, said front and rear plates being moveable relative to the support frame and bed deck to allow for expansion and contraction of the side wall cabinets.

2. The utility body of claim 1 in which the mid-portions of the side wall cabinets are firmly secured to the bed deck while the front and rear portions of the side wall cabinets are slidably secured to the bed deck, thereby allowing movement of the side wall cabinets relative to the bed deck due to expansion and contraction of the side wall cabinets.

3. The utility body of claim 2 in which the frame and side wall cabinets include slotted holes which allow the side wall cabinets to be slidably secured to the frame and bed deck.

4. The utility body of claim 1 in which the support frame includes a generally planar frame portion on which the bed deck is mounted and outrigger members located below said planar frame portion for supporting bottom surfaces of the side wall cabinets, the outrigger members allowing the side wall cabinets to extend below the bed deck.

5. The utility body of claim 1 in which each side wall cabinet has a hollow plastic door, the door having a side edge with a vent opening therethrough for venting the door.

6. The utility body of claim 5 in which the door is secured to a hinge extending perpendicularly from the utility body, the hinge providing a stop for the door.

7. The utility body of claim 5 in which a drip edge extends along an interior edge of the door.

8. The utility body of claim 1 in which each side wall cabinet has a vent comprising an exterior opening connected to an interior opening by a vent passageway, the exterior and interior openings being offset from each other.

9. The utility body of claim 8 in which the exterior opening is positioned above the interior opening.

10. The utility body of claim 9 in which the vent further comprises a drain extending downwardly from the vent passageway for draining water from the vent passageway.

11. The utility body of claim 10 in which the exterior opening is covered by downwardly directed louvres and the interior opening is covered by upwardly directed louvers.

12. A utility body for mounting to a frame of a vehicle comprising:

a metallic support frame for securing to the vehicle frame;

a metallic bed deck mounted on the support frame;

a first plastic side wall cabinet mounted to the support frame and the bed deck on a first side of the bed deck;

a second plastic side wall cabinet mounted to the support frame and the bed deck on a second side of the bed deck, each side wall cabinet having a front portion, a mid-portion and a rear portion extending along a longitudinal direction, the mid-portions of the side wall cabinets being firmly secured to the bed deck while the front and the rear portions of the side wall cabinets include slotted holes which allow the side wall cabinets to be slidably secured in the longitudinal direction to the support frame and the bed deck, thereby allowing movement of the side wall cabinets in the longitudinal direction relative to the support frame due to expansion and contraction of the plastic side wall cabinets; and front and rear plates securing respective front and rear portions of the first and second side wall cabinets together without being secured to the support frame and the bed deck, said front and rear plates being movable relative to the support frame and bed deck to allow for expansion and contraction of the side wall cabinets.

13. A method of forming a utility body to be mounted to a frame of a vehicle comprising the steps of:

forming a metallic support frame for securing to the vehicle frame;

mounting a metallic bed deck on the support frame;

mounting a first plastic side wall cabinet to the support frame on a first side of the bed deck;

mounting a second plastic side wall cabinet to the support frame on a second side of the bed deck, the first and second side wall cabinets each including a storage compartment, each side wall cabinet having a front portion, a mid-portion and a rear portion extending along a longitudinal direction, the front and rear portions of the side wall cabinets being slidably secured in the longitudinal direction to the support frame, thereby allowing movement of the side wall cabinets in the longitudinal direction relative to the support frame due to expansion and contraction of the side wall cabinets;

securing the front portions of the first and second side wall cabinets together with a front plate; and securing the rear portions of the first and second side wall cabinets together with a rear plate, the front and rear plates not being secured to the support frame and bed deck and are movable relative to the support frame and bed deck to allow for expansion and contraction of the side wall cabinets.

14. The method of claim 13 further comprising the steps of:

firmly securing the mid-portions of the sidewall cabinets to the bed deck; and slidably securing the front and rear portions of the side wall cabinets to the bed deck, thereby allowing movement of the side wall cabinets relative to the bed deck due to expansion and contraction of the side wall cabinets.

15. The method of claim 13, further comprising the step of providing each side wall cabinet with a hollow plastic door, the door having a side edge with a vent opening therethrough for venting the door.

16. The method of claim 13 further comprising the step of providing each side wall cabinet with a vent, the vent including an exterior opening connected to an interior opening by a vent passageway, the exterior and interior openings being offset from each other.

17. The method of claim 16 further comprising the steps of:

positioning the exterior opening above the interior opening; and extending a drain downwardly from the vent passageway for draining water from the vent passageway.

18. The method of claim 17 further comprising the steps of:

covering the exterior opening with downwardly directed louvres; and covering the interior opening with upwardly directed louvres.

19. A method of forming a utility body to be mounted to a frame of a vehicle comprising the steps of:

forming a metallic support frame for securing to the vehicle frame;

mounting a metallic bed deck on the support frame;

mounting a first plastic side wall cabinet to the support frame and the bed deck on a first side of the bed deck;

mounting a second plastic side wall cabinet to the support frame and the bed deck on a second side of the bed deck, each side wall cabinet having a front portion, a mid-portion and a rear portion extending along a longitudinal direction, the mid-portions of the side wall cabinets being firmly secured to the bed deck while the front and rear portions of the side wall cabinets include slotted holes which allow the side wall cabinets to be slidably secured in the longitudinal direction to the support frame and the bed deck, thereby allowing movement of the side wall cabinets in the longitudinal direction relative to the support frame due to expansion and contraction of the plastic side wall cabinets; and securing the front portions of the first and second side wall cabinets together with a front plate; and securing the rear portions of the first and second side wall cabinets together with a rear plate, the front and rear plates not being secured to the support frame and bed deck and are moveable relative to the support frame and bed deck to allow for expansion and contraction of the side wall cabinets.

* * * * *